(12) United States Patent
Boemmel et al.

(10) Patent No.: US 6,733,322 B2
(45) Date of Patent: May 11, 2004

(54) PLUGGABLE CONNECTION HOUSING WITH ANTI-KINK ELEMENT

(75) Inventors: Christian Otto Boemmel, Langen (DE); Rolf Jetter, Darmstadt (DE); Dietrich Kuempel, Ginsheim-Gustavsburg (DE); Guido Gertrudis Maria Petrus Van De Burgt, Gross-Gerau (DE)

(73) Assignee: Tyco Electronics AMP GmbH, Bensheim (DE)

(*) Notice: Subject to any disclaimer, the term of this patent is extended or adjusted under 35 U.S.C. 154(b) by 0 days.

(21) Appl. No.: 10/363,301

(22) PCT Filed: Aug. 29, 2001

(86) PCT No.: PCT/IB01/01551
§ 371 (c)(1),
(2), (4) Date: Jun. 20, 2003

(87) PCT Pub. No.: WO02/19473
PCT Pub. Date: Mar. 7, 2002

(65) Prior Publication Data
US 2004/0014352 A1 Jan. 22, 2004

(30) Foreign Application Priority Data
Sep. 1, 2000 (DE) .......................................... 100 43 182

(51) Int. Cl.[7] .............................................. H01R 13/56
(52) U.S. Cl. ...................................................... 439/445
(58) Field of Search ................................. 439/445–447

(56) References Cited

U.S. PATENT DOCUMENTS

| 3,858,160 A | * | 12/1974 | Denton ........................ 174/135 |
| 5,315,062 A | * | 5/1994 | Hoshino ...................... 174/52.1 |
| 5,499,932 A | * | 3/1996 | Tanaka et al. ............... 439/446 |
| 5,640,476 A | | 6/1997 | Womack et al. ............... 385/86 |
| 5,890,926 A | * | 4/1999 | Pauza et al. ................. 439/445 |
| 6,338,645 B1 | * | 1/2002 | Tan et al. .................... 439/446 |

FOREIGN PATENT DOCUMENTS

| DE | 44 12 571 C1 | 6/1995 |
| DE | 10 27 901 A1 | 7/2001 |
| EP | 0 375 669 A2 | 6/1990 |
| EP | 0 629 887 A1 | 12/1994 |
| GB | 442197 | 2/1936 |

* cited by examiner

Primary Examiner—Gary F Paumen

(57) ABSTRACT

A pluggable connection housing (1) with a boot (2) has at least one contact passageway (7, 8) having plug-in apertures (5, 6) at its two ends. Respective ends of male and female members arranged on cables can be arranged therein and produce a pluggable connection. The book (2) can be at least partially detachably fastened to the pluggable connection housing (1). In order to simplify construction and handling of pluggable connection housing (1) and boot (2) and, at the same time, to allow more ways of arranging the boot (2) relative to the pluggable connection housing (1), the boot (2) is substantially tubular and has a peripheral undercut at least in certain places in the peripheral direction at one plug-in end, which undercut engages with at least one undercut element (12) arrange in the plug-in aperture (5, 6) in the plugged-in position (13) of the plug-in end (9).

26 Claims, 8 Drawing Sheets

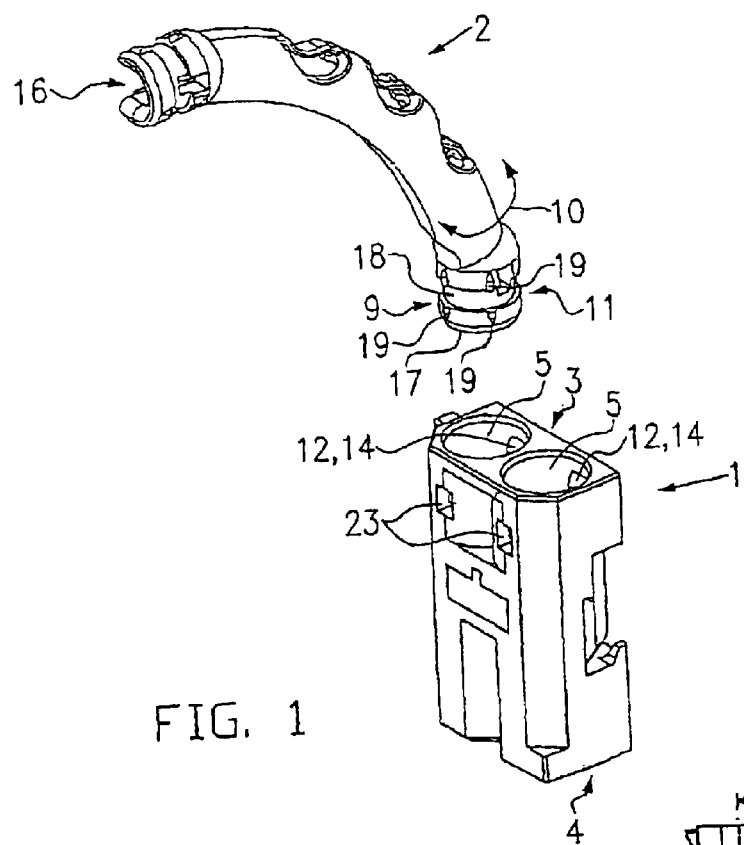
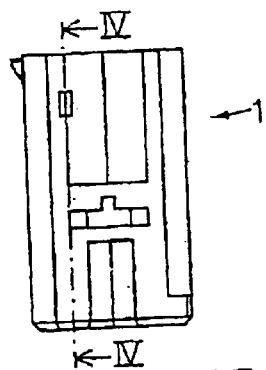
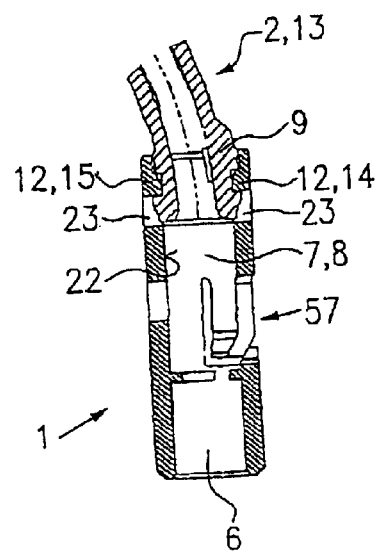
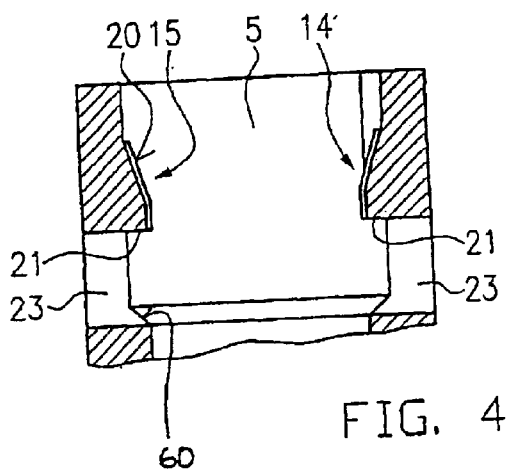
FIG. 1
FIG. 2
FIG. 3
FIG. 4

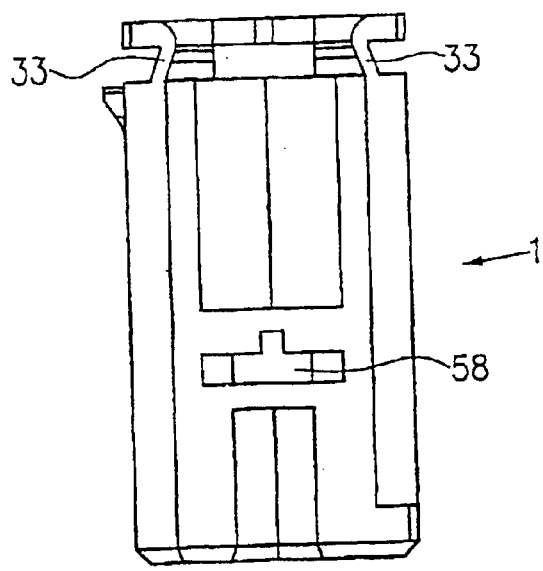
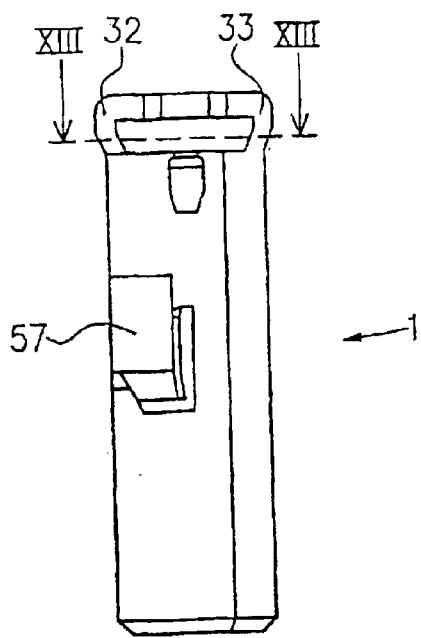
FIG. 10  FIG. 11
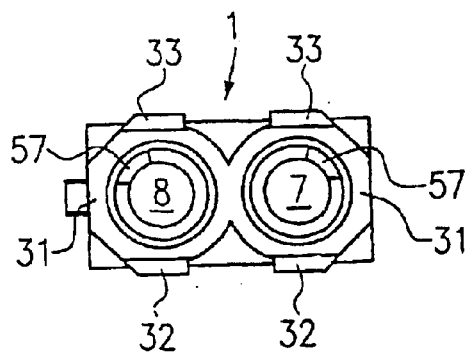
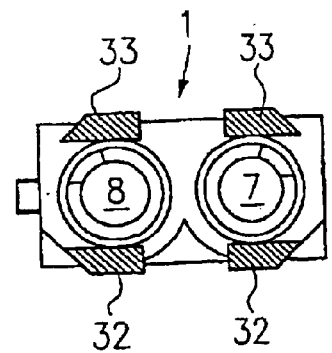
FIG. 12  FIG. 13

PLUGGABLE CONNECTION HOUSING WITH ANTI-KINK ELEMENT

FIELD OF THE INVENTION

The invention relates to a pluggable connection housing with a boot element which maintains the minimum bending radius of a cable attached thereto.

BACKGROUND OF THE INVENTION

A combination of pluggable connection housing and booted or anti-kink element of this type is known from DE 44 12 571 C1. In the known pluggable connection housing, a contact passageway or duct is provided for an optical fibre cable and a contact passageway duct for a metal cable. Corresponding male and female members for the respective cable are arranged in the contact passageways and connected to one another while producing a pluggable connection.

In order to retain a minimum bending radius when leaving the pluggable connection housing, in particular in the optical fibre cable, the pluggable connection housing has a boot or anti-kink element. According to DE 44 12 571 C1 this is formed in two parts from a mount and a latching cap. The mount is formed integrally with the pluggable connection housing and the latching cap is latched thereto with the cable inserted therein. Accordingly, the boot is to be fastened at least partially detachably to the pluggable connection housing, the detachable part being the latching cap.

The connection of latching cap to the mount or pluggable connection housing can be easily accomplished by various methods known in the art. However, the construction is relatively complex as the mount is formed integrally with the rest of the pluggable connection housing. In addition, due to the fixed orientation of the mount only a correspondingly orientated delivery of the optical fibre cable is possible when the latching cap is unlatched. The latching elements are arranged on the latching cap or pluggable connection housing to correspond to this single possible orientation of latching cap relative to pluggable connection housing and the latching cap itself is shaped specifically to be arranged in its orientation relative to the pluggable connection housing.

SUMMARY OF THE DISCLOSURE

The object of the invention is to improve a pluggable connection housing with the boot as described herein so that both pluggable connection housing and boot are constructed more simply and can be handled more easily and, at the same time, can be varied in their orientation relative to one another.

This object is achieved in conjunction with the features of the preamble of claim 1 in that the boot is substantially tubular and has peripheral undercuts spaced in the peripheral direction at one plug-in end. A respective undercut engages with at least one undercut element arranged in the plug-in aperture when the plug-in end is in an inserted or plugged-in position.

The boot is configured such that the corresponding curvature thereof prevents the bending radius of a cable, in particular an optical fibre cable, from falling below a minimum bending radius. The tubular design of the boot, insures that a corresponding cable can be securely guided and received therein without a further counter-element. The boot, like the pluggable connection housing, can be handled separately and both can be easily connected together. An undercut is provided at the plug-in end of the boot for reciprocal detachable connection. This can, for example, elastically deform during insertion into a plug-in aperture of a corresponding contact passageway and can then elastically reform after engaging behind the undercut element. The plug-in position of the boot is fixed by the engagement of undercut element and undercut.

Due to the shape of the boot and its connection to the pluggable connection housing, the orientation of the boot is variable relative to the pluggable connection housing. Consequently, there is a plurality of possibilities for leading the cable relative to the pluggable connection housing. As a result, there are more possible applications for the pluggable connection housing and the boot, in particular for use in assembly sites which are difficult to access or when there is little space, as is the case, for example, in a motor vehicle.

The pluggable connection housing can have two or more contact passageways extending, in particular, parallel to one another. The contact passageways can be used for metal cables, optical fibre cables or other cable-type line systems of both male and female configurations. The boot can also be designed in such a way that a specific radius can be set when leading a corresponding cable from the pluggable connection housing, such that the cable is relieved of tension owing to the boot or pluggable connection housing or else a certain degree of axial movement is possible.

In a simple embodiment, two substantially opposing latching lugs can be arranged in at least one plug-in aperture of a contact passageway as an undercut element. When inserting the plug-in end of the boot, the undercut formed there latches with the two latching lugs. The plug-in position of the plug-in end is thereby fixed. The boot can be detached from the pluggable connection housing by removing the plug-in end from the plug-in aperture. Undercut and/or latching lugs are designed in this case so as to be elastic enough to allow the detachment when a sufficient force is applied.

The boot can have a slot to simplify insertion of a cable and, in particular, of an optical fibre cable. As a result, an elasticity is produced in a simple manner in the region of the plug-in end for latching to and unlatching from the pluggable connection housing.

The undercut on the boot can, for example, be formed by a peripheral flange projecting radially outwards or by latching elements on the outside of the boot. In a preferred embodiment, the undercut of the boot is formed by a latching groove extending at a distance from the end face of the plug-in end. The corresponding latching lugs or the undercut element in the plug-in aperture can engage therein in the plugged-in position. It is noted that more than two latching lugs can be arranged as undercut elements in the plug-in aperture.

In order to hold the boot in the plug-in aperture in a relatively secure manner when it is in the plugged-in position, compensating projections can project radially outwards from the boot or else radially inwards inside the plug-in aperture. These compensating projections accordingly contact the inside of the plug-in aperture or the outside of the plug-in end and ensure that the boot is held in position with relatively little play.

The latching lugs can project from an inner wall of the plug-in aperture or the contact passageway. However, to avoid the need for excessive deformation of the corresponding plug-in end of the boot to latch with the latching lugs, a latching lug of this type can be designed as a latching slope extending obliquely inwards with an adjoining offset radially outwards in the inner wall of the contact passageway. As a result, the undercut on the boot can reform, or resiliently return toward its unstressed state, into the offset radially outwards with respect to the inner wall of the contact passageway.

The offset can be formed by a corresponding depression in the inner wall. In a preferred embodiment, the offset can be formed by a housing aperture extending radially outwards.

An offset of this type can be formed during the manufacture of the pluggable connection housing, which is preferably made of plastic material, by a corresponding core, which holds the outwardly extending housing apertures open during shaping of the pluggable connection housing. Another option for manufacturing the offset, a longitudinal groove extends along an inner wall of the contact passageway from a visible side of the contact of the pluggable connection housing.

The latching lugs can have identical configurations to simplify construction.

In order to emphasise the plug-in aperture visually and simultaneously to also make it more accessible, the contact passageway can project upwards relative to the rest of the pluggable connection housing with an end portion comprising the plug-in aperture. As a result, it can, on the one hand, be easily ascertained visually to which end the boot is to be fastened and in what manner the pluggable connection housing can be installed into a component housing.

The configuration of the end portion permits subsequent processing thereof to be simplified in order, for example, to form a corresponding undercut element. By way of example, the end portion can have at least one latching depression as an undercut element on its inside. The latching depressions can also be formed by corresponding radially outwardly extending apertures in the end portion.

In order to be able to fix the plug-in position of the boot more efficiently, the plug-in aperture can be surrounded by a rim projecting radially externally beyond the end portion. A corresponding rim on the plug-in end of the boot can be brought into contact therewith.

In order to design the end portion so as to be more stable, struts extending from the rim downwards in the direction of the rest of the pluggable connection housing can be arranged along an external face of the end portion.

In another embodiment, in which the plug-in aperture is also emphasised at least visually, the latter can be formed by a plug-in ring held at a distance from the rest of the pluggable connection housing. This is arranged coaxially with the respective contact passageway, but at a certain distance therefrom.

To hold the plug-in ring on the rest of the pluggable connection housing, at least two webs may be provided between plug-in ring and the rest of the pluggable connection housing.

In order to be able to hold the plug-in ring elastically within certain limits, the webs can extend so as to bend radially outwards. This allows a specific variation of the arrangement of plug-in ring relative to the contact passageway.

Owing to spacing between the plug-in ring and the contact passageway, a separate undercut element can be dispensed with, if, for example, an underside of the plug-in ring forms the undercut element directly.

In order to be able to safeguard the boot against unintentional detachment from the pluggable connection housing, a plug-in slot extending transversely to the contact passageway can be formed adjacent to the plug-in aperture of the pluggable connection housing. A substantially U-shaped circlip can be inserted into the slot. This circlip can prevent unintentional detachment of the latching engagement of plug-in end of the boot and pluggable connection housing. In addition, the circlip can simultaneously or supplementarily be designed as an undercut element, so, instead of the latching connection already mentioned or supplementarily thereto, it allows the detachable connection of boot and pluggable connection housing.

In a further embodiment of the invention it is possible that a corresponding plug-in slot extends only so far into the pluggable connection housing such that a corresponding circlip engages precisely in the latching groove on the corresponding boot or engages behind the corresponding undercut. It is not necessary for the plug-in slot and/or circlip to extend up to the back of the pluggable connection housing remote from the plug-in aperture.

In addition, in a further embodiment of the invention there is the possibility of arranging corresponding plug-in elements on opposing sides of the pluggable connection housing, it being possible to insert corresponding circlips into these plug-in slots in opposing directions. It is also conceivable that with opposingly arranged plug-in slots of this type, approximately L-shaped circlips can be inserted in plug-in slots associated with only one boot to secure the boot.

In a simple embodiment, the circlip can engage behind the undercut on the boot when it is plugged-in, and can, in particular, engage in the latching groove, with at least one leg.

In some applications, it can be regarded as being advantageous both for fixing the circlip in the plug-in slot and for improving the engagement with the corresponding undercut on the boot if the plug-in slot continues in a receiving aperture formed in the wall of the pluggable connection housing for insertion of a free end of the leg remote from its slot aperture. This receiving aperture can be continued up to the outside of the wall of the pluggable connection housing.

It is also advantageous with two contact passageways if the circlip has two outer legs and one central leg, a plug-in end of a boot being arranged and detachably held in the inserted position between the middle and an external leg respectively.

The central leg can in particular be designed in this connection such that it acts as an undercut element in the direction of the respective contact passageway on both sides.

In order to be able to ascertain correct arrangement and retention of the boot in the pluggable connection housing visually, the circlip can be inserted into the is plug-in slot so as to be flush and can be latched in its end position.

Latching can be, for example, by means of corresponding latching elements at the free ends of the clip or in another manner. In an easily produced embodiment the circlip has a latching element on its upper side which can latch with a substantially complementary counter latching element between the plug-in apertures in the pluggable connection housing in the end position of the circlip.

An example of a counter-latching element of this type is a substantially circular hole which extends from a upper side of the pluggable connection housing in the direction of the plug-in slot and is arranged substantially between the plug-in apertures of the contact passageways.

To simplify introduction of the circlip into the plug-in slot, a rail-shaped guide with which a guide groove can be associated on an underside of the circlip for guidance along the guide rail, extends between the contact passageways.

Insertion of the circlip into the slot aperture can also be simplified in that the plug-in slot is surrounded by a locating edge inclined obliquely inwards in the plug-in direction of the circlip. This locating edge can also be formed on the leading end of the rail-shaped guide facing the slot aperture.

Advantageous embodiments of the invention will be described in more detail hereinafter with the aid of the accompanying drawings, in which:

BRIEF DESCRIPTION OF THE DRAWINGS

FIG. 1 shows a perspective view of a first embodiment of the pluggable connection housing according to the invention and boot;

FIG. 2 shows a longitudinal section through FIG. 1 in the plugged-in position of the boot;

FIG. 3 shows a back view of a pluggable connection housing according to FIG. 1 in a second embodiment;

FIG. 4 shows a section along the line IV—IV of FIG. 3;

FIG. 10 shows a back view of the pluggable connection housing according to FIG. 9;

FIG. 11 shows a side view of the pluggable connection housing according to FIG. 9;

FIG. 12 shows a plan view of the pluggable connection housing according to FIG. 9;

FIG. 13 shows a section along the line XIII—XIII of FIG. 11;

DETAILED DESCRIPTION OF THE EMBODIMENT

Figure 5:
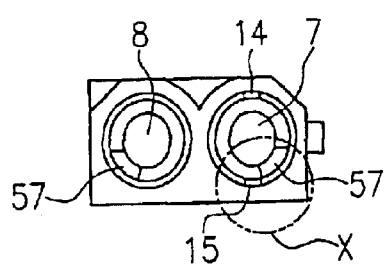
FIG. 5 shows a plan view of the pluggable connection housing according to FIG. 3.

FIG. 1 shows a pluggable connection housing 1 with a boot 2. The boot or anti-kink element 2 is substantially tubular and extends approximately in a quarter circle so as to be curved. A slot 16 is formed in the boot 2 along one side. On one plug-in end 9, the boot 2 has an undercut 11 in the form of a latching groove 18 extending in the peripheral direction as represented by arrow 10. Compensating projections 19 which project radially outward, are positioned above and below the latching groove and are spaced apart in the peripheral direction 10. Compensating projections 19 are in particular arranged between the latching groove 18 and, for example, an end face 17 of the plug-in end 9.

In the embodiment shown, two contact ducts or passageways 7, 8, arranged parallel to one another, are provided in the pluggable connection housing 1 (see also FIGS. 2 and 5). These each terminate in upper and lower end faces of the pluggable connection housing 1 with plug-in apertures 5, 6 (see also FIG. 2).

The plug-in apertures 5, 6 receive male and female members, not shown, which are arranged on the ends of corresponding cables and which produce a pluggable connection of the corresponding cables upon mutual connection. The pluggable connection housing according to the invention is used in particular for optical fibre cables which are not to be bent below a minimum bending radius when led out of the pluggable connection housing 1. This is ensured by the boot 2.

Undercut elements 12 which engage with the undercut 11 on the boot when the latching groove 18 in the plugged-in position 13 thereof (see FIG. 2) are arranged in the plug-in apertures 5. As shown in FIG. 4, the undercut element 12 is formed by two opposing latching lugs 14, 15 which project radially inwards relative to an inner wall of the contact passageways 7, 8. The latching lugs 14, 15 have a latching slope 20 extending radially inwards to which an offset 21 extending radially outwards is adjoined. This offset is formed by a housing aperture 23 penetrating the wall of the pluggable connection housing 1.

FIG. 2 shows a longitudinal section through, for example, the contact passageway 7 or 8 of the pluggable connection housing 1 according to FIG. 1. The boot 2 is inserted with its plug-in end 9 in plug-in aperture 5 of the pluggable connection housing 1. Accordingly, the latching lugs 14, 15 engage in the latching groove 18 and undercut elements 12 engage undercut 11. As a result, the plug-in position 13 of the boot is determined.

In addition to engagement behind the latching lugs 14, 15, the plug-in position 13 of the boot can also be determined by connection of the end face 17 of the plug-in end 9 to a stop 60 as shown in FIG. 4. This stop 60 is formed, for example, by a constriction of the diameter of the contact passageway 7, 8.

In FIG. 2 it can be seen that a portion of a wall of each contact passageway 7, 8 is formed with a retaining latching element 57. This engages behind a correspondingly formed edge of a male member which is arranged on the end of a, for example, optical fibre cable (not shown). A corresponding female element (not shown) can be inserted from the plug-in aperture 6 side into the pluggable connection housing.

It is also noted that the contact passageways 7, 8 can be used for various cables. In one embodiment, the contact passageway connected to the boot 2 receives an optical fibre cable and the other contact passageway can receive a metal cable in which the boot is generally not necessary.

Owing to the design of the undercut on the boot and the corresponding undercut element 12 on the pluggable connection housing, the boot can be arranged in various orientations relative to the housing.

FIG. 3 shows an undercut of a pluggable connection housing 1 similar to FIG. 1. In this case, an undercut element in the form of two latching lugs 14, 15 is provided in only one contact passageway (see also FIG. 5). Otherwise, in this embodiment, as in the following embodiments, reference is made to the description of FIG. 1, identical parts being designated by identical reference numerals respectively.

FIG. 4 shows a section along the line IV—IV of FIG. 3. Latching lugs 14, 15 have latching slopes 20 and offset 21. The latching slopes 20 extend radially inwards and terminate in an axially extending end portion to which the offset 21 formed by the apertures 23 is adjoined.

FIG. 5 shows a plan view of the pluggable connection housing 1 according to FIG. 3. The two contact passageways 7, 8 are identical in many features. One retaining latching element 57 respectively projects into each passageway 7,8 (see also FIGS. 1 and 2).

Figure 6:
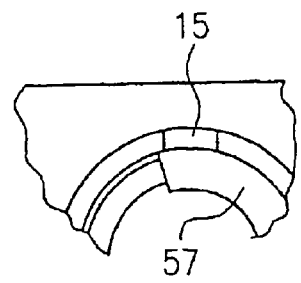
FIG. 6 shows an enlarged drawing of a detail "X" of FIG. 5.

FIG. 6 shows an enlarged detail "X" of FIG. 5. The latching lug 15 which projects with its corresponding latching slope radially inwards into the contact passageway 7 is shown. In addition, the partly circle-shaped retaining latching element 57 can be seen.

Figure 7:
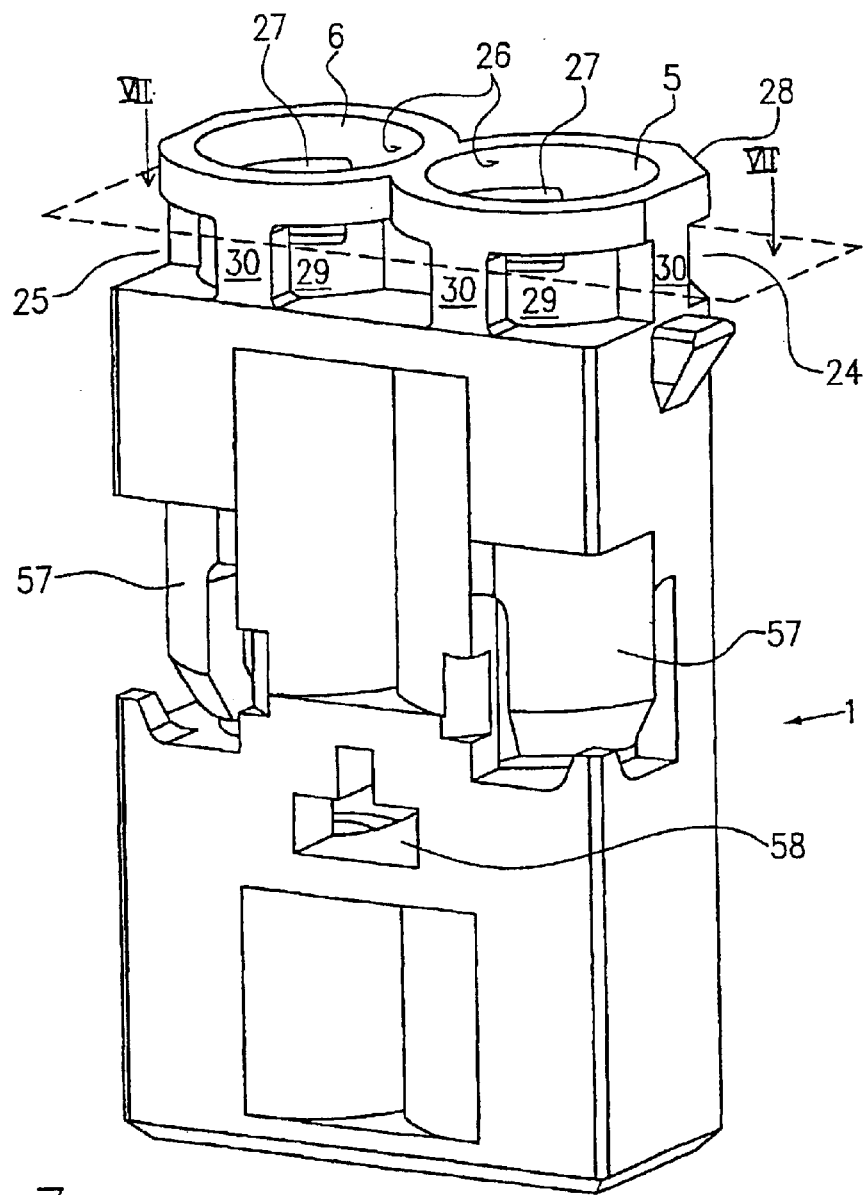
FIG. 7 shows a perspective front view of a further embodiment of a pluggable connection housing.

FIG. 7 shows an octagonal perspective view of a second embodiment of a pluggable connection housing 1. This differs substantially from the first embodiment due to upwardly projecting end portions 24, 25 of the contact passageways 7, 8. The end portions 24, 25 have an inside 26 in which latching depressions 27 are formed as undercut elements 12. They can extend to the outside of the end portions 24, 25. The corresponding plug-in apertures 5 are surrounded at the upper ends of the end portions 24, 25 by a rim 28. Struts 30 extend from the underside thereof in the direction of the rest of the pluggable connection housing 1.

Figure 8:
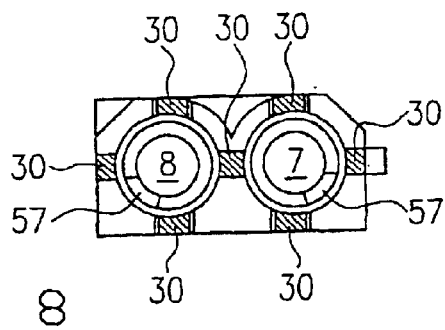
FIG. 8 shows a section along the line VIII—VIII of FIG. 7.

FIG. 8 shows a section along the line VIII—VIII of FIG. 7. Struts 30 are mutually offset in the peripheral direction of the corresponding contact passageways 7, 8 by 90° respectively. One strut, which is arranged between the two contact passageways 7, 8, is associated with both end portions 24, 25 (see also FIG. 7).

Figure 9:
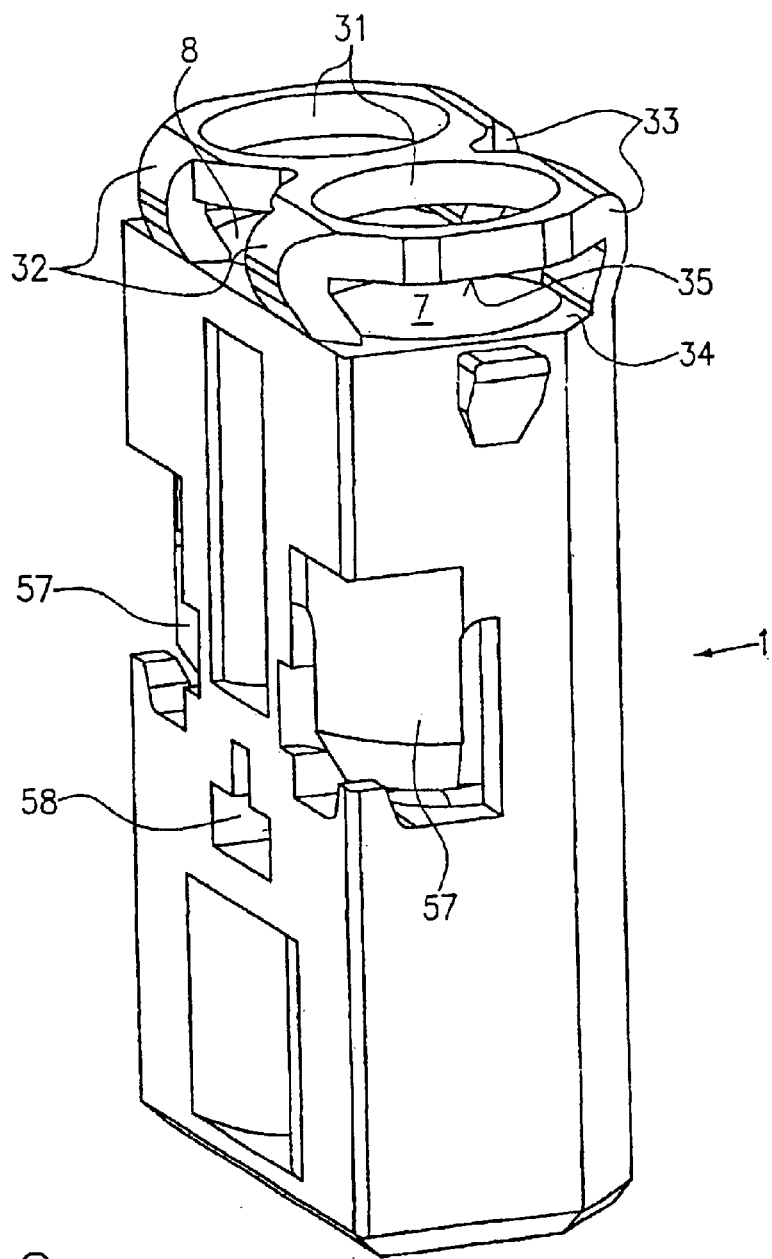
FIG. 9 shows a perspective view of a further embodiment of a pluggable connection housing according to the invention.

FIG. 9 shows a further embodiment of a pluggable connection housing 1 in perspective view obliquely from the front. This differs from the previous examples in that plug-in rings 31 are arranged at a distance from the actual contact passageways 7, 8. These are arranged coaxially with the rest of the contact passageways 7, 8 and are held by webs 32, 33 on opposing sides at an upper end 34 of the pluggable connection housing 1. The webs 32, 33 extend radially outwards in a bent manner.

Reference is made in FIG. 9 to a plug-in slot 58 for a secondary lock member which is formed beneath the retaining latching elements 57 in the pluggable connection housing 1. Male and female members are secured in their connection position in the pluggable connection housing 1 when the secondary lock member is plugged in the plug-in slot 58.

FIG. 10 shows a back view of the pluggable connection housing 1 according to FIG. 9. It can in particular be seen that the webs 33 extend in a partially curved manner along the plug-in rings 31.

FIG. 11 shows a side view of the pluggable connection housing 1 according to FIG. 10. In this drawing, the curvature of the webs 32, 33 extending radially outward relative to the plug-in rings can clearly be seen.

FIG. 12 shows a plan view of the embodiment according to FIG. 10. As shown, in plan view, the plug-in rings 31 have an approximately hexagonal contour.

In the embodiments of FIGS. 7 to 13, an underside of the plug-in ring 31 or the corresponding latching depressions 27 serve as undercut element. A corresponding undercut on the plug-in end of the boot 2 engages therein or engages beneath the underside 35 of the plug-in ring 31. In this case, the undercut on the plug-in end can be formed, for example, by a corresponding peripheral projection in contrast to the latching groove.

FIG. 13 shows a section along the line XIII—XIII of FIG. 11, showing a cross-section of the webs 32, 33. The cross-section has a wedge-shaped chamfer on the opposing sides of the web 32 and 33 respectively.

Figure 14:
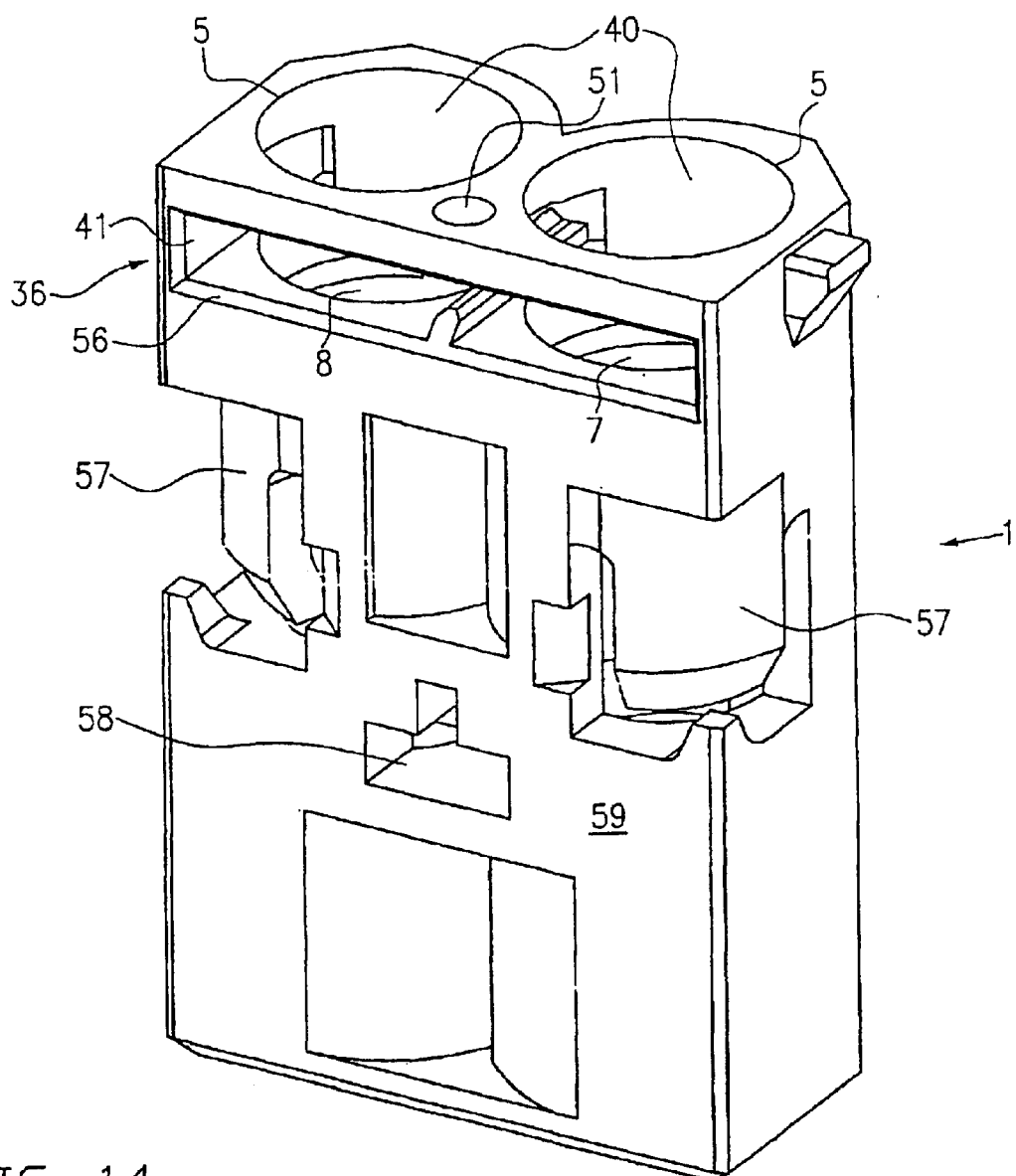
FIG. 14 shows a perspective view of a further embodiment of a pluggable connection housing according to the invention.
Figure 17:
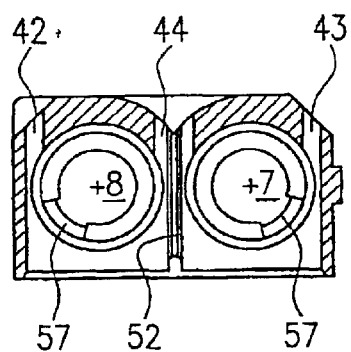
FIG. 17 shows a section along the line XVII—XVII of FIG. 15.

FIG. 14 shows a perspective view obliquely from the front of a further embodiment of a pluggable connection housing 1 according to the invention. This differs from the previous embodiments in the arrangement of a plug-in slot 36 which extends transversely to the contact passageways 7, 8 adjacent to the plug-in apertures 5. The plug-in slot 56 has a slot aperture 41 on sides of a side face 59 of the pluggable connection housing 1 in which a circlip 37 (FIGS. 18 and 19) can be inserted. The plug-in slot 36 extends to an inner wall 40 of the contact passageways 7, 8 remote from the slot aperture 41. The plug-in slot 36 is lengthened into the wall 40 at some points by corresponding receiving apertures 42, 43, 44, see in particular FIG. 17. These can continue up to the outside of the pluggable connection housing 1.

The length of the plug-in slot 36 or a length of a corresponding circlip 37 should be at least large enough for the circlip 37 to engage with its free ends the latching groove 18 (see FIG. 1) of the boot when in its plugged-in position.

It is also noted in this context that plug-in slots 36 (FIGS. 20, 21) are to be accessible from opposing sides of the pluggable connection housing 1 via corresponding slot apertures 41 thereby allowing corresponding circlips 37 to be inserted in opposite directions to one another.

Figure 15:
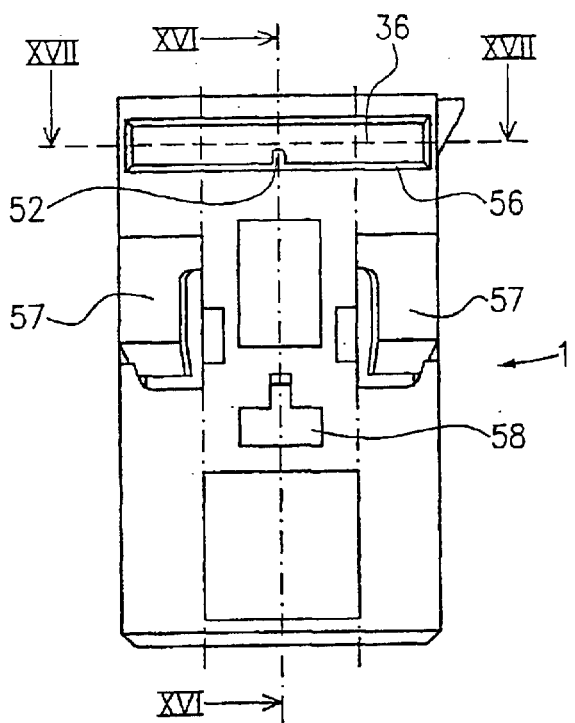
FIG. 15 shows a front view of the pluggable connection housing according to FIG. 14.

FIG. 15 shows a front view of the pluggable housing connection 1 of FIG. 14. The slot aperture 41 has a rectangular contour, peripheral lead-in edges 56 being formed along the slot aperture 41. The lead-in edges extend obliquely inwards towards one another. A rail-shaped guide 52 is arranged approximately centrally with respect to the slot aperture 41. The guide 52 extends in the plug-in direction 55, see in particular FIG. 19. The guide 52 extends in the direction of the receiving aperture 44 (see FIG. 17) and terminates substantially at the outside of the pluggable connection housing 1. The various receiving apertures 42, 43 and 44 receive corresponding legs 45 of the circlip 37 (see in particular FIG. 19).

Figure 16:
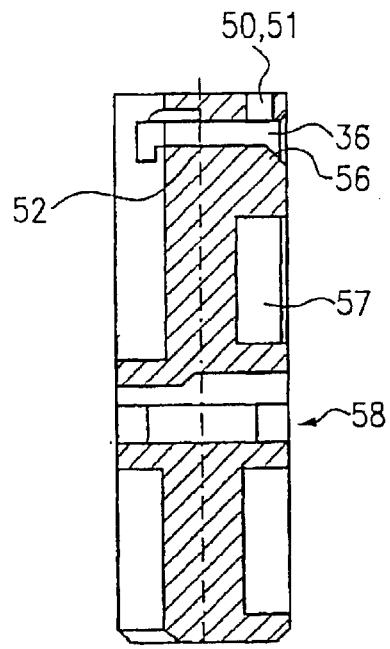
FIG. 16 shows a section along the line XVI—XVI of FIG. 15.

FIG. 16 shows a longitudinal section along the line XVI—XVI of FIG. 15. This longitudinal section is located centrally through the guide rail 52. It can be seen in particular that the oblique gradient of the locating edge 56 continues at the front end of the guide rail 52 (see also FIG. 15).

Figures 18, 19:
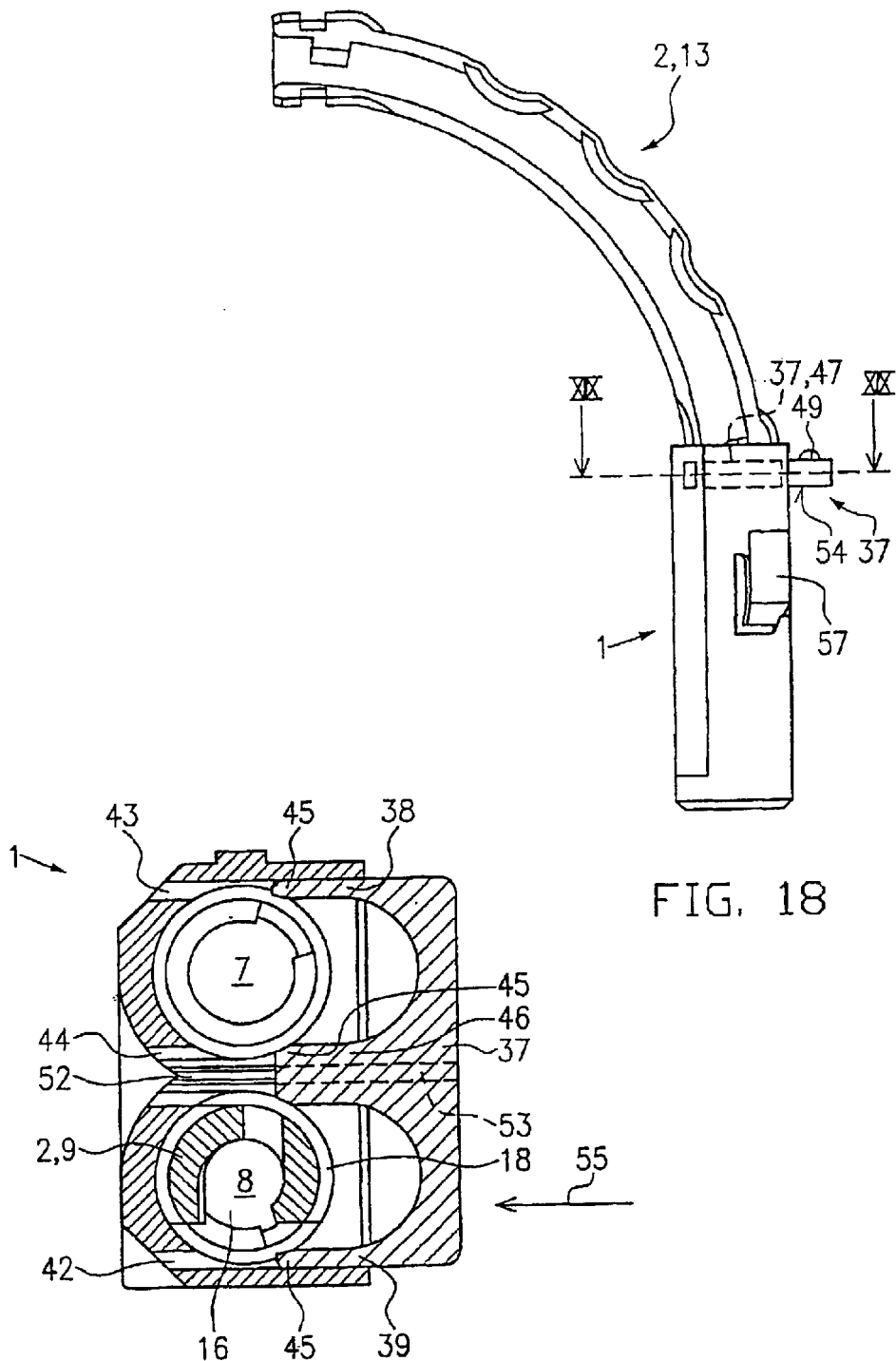
FIG. 18 shows a side view of the pluggable housing connection according to FIG. 14 with the boot in the plugged-in position.
FIG. 19 shows a section along the line XIX—XIX of FIG. 18.

FIG. 18 shows a side view of the pluggable connection housing 1 according to FIG. 14 with the boot 2 in the plugged-in position 13. The circlip 37 has not yet been fully inserted into the plug-in slot 36 and still projects partially from the slot aperture 41 (see also FIGS. 19, 20 and 21). If the circlip 37 is inserted completely, it assumes the end position 47 shown in dashed lines in FIG. 18. It is arranged therein so as to be substantially flush with the outside or side face 59 of the pluggable connection housing 1 according to FIG. 14.

FIG. 19 shows a section along the line XIX—XIX of FIG. 18. The circlip 37 has three legs 38, 39, 46. The legs 38, 39 are external legs and the leg 46 is arranged centrally therebetween. The legs 38, 39 and in particular 46 form undercut elements 12 which engage in the embodiment shown, for example, in the latching groove 18 at the plug-in end 9 of the boot 2. The central leg 46 is associated in this case as an undercut element with both contact passageways 7, 8 and can simultaneously secure two boots 2 in their plugged-in position 13. A guide groove 53, which can be displaced along the guide rail 52 when the circlip 37 is displaced in the plug-in direction 55, is formed on an underside 54 of the circlip 37.

Free ends 45 of the corresponding legs 38, 39 and 46 can be inserted directly into the receiving apertures 42, 43 and 44, wherein the circlip 37 can be latched in its end position 47 (see, for example, FIG. 18).

The boot 2 is inserted into the contact passageway 8 according to FIG. 19 with its plug-in end 9, wherein the central leg 46 can be inserted into the corresponding latching groove 18.

Corresponding latching elements, which act as undercut elements, can be dispensed with in the embodiments according to FIGS. 14 to 21. The undercut elements are formed in this case by the various legs. It is, however, also possible that latching elements or latching engagements are additionally used as in the embodiments described above. In such case, the circlip 37 secures the boot 2 in its plugged-in position 13, in addition to a further engagement in, for example, the latching groove 18.

Figure 20:
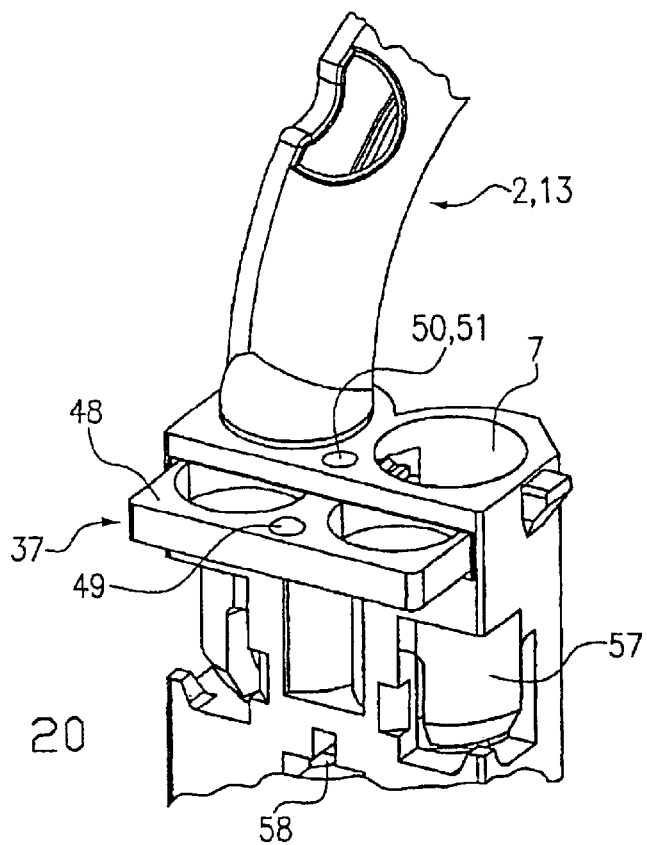
FIG. 20 shows a perspective view obliquely from the front in accordance with FIG. 18.

FIG. 20 shows a perspective view obliquely from the front of the embodiment according to FIG. 18. Latching element 49 and counter-latching element 50 cooperate to latch the circlip 37 in its end position 47 (see FIG. 18). The latching element 49 is formed as a spherical cap and the counter-latching element as a hole 51 in an upper end face of the pluggable connection housing 1 (see also FIG. 14).

Figure 21:
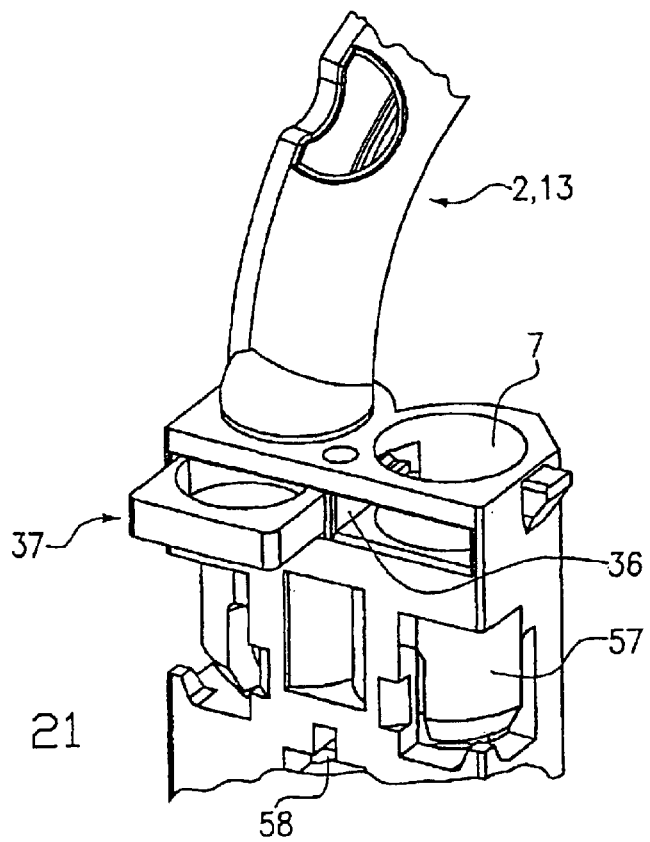
FIG. 21 shows a perspective view obliquely from the front similarly to FIG. 20 for a further embodiment of a pluggable connection housing.

FIG. 21 shows a perspective view similar to FIG. 20, of an alternative embodiment. Here, a single circlip 37 is associated with each contact passageway 7, 8 and with the boot 2 which is connectable thereto. The plug-in slot 36 is in two parts and the circlip 37 is substantially U-shaped with two parallel legs. In this way, the boot 2 can be detachably fastened in the plug-in aperture 5 of each contact passage 7, 8 (see also FIG. 14).

What is claimed is:

1. A pluggable electrical connection housing with a cable boot, the pluggable connection housing having at least one contact passageway comprising plug-in apertures at its two ends, in which contact passageway male and female members arranged at the respective ends of cables can be arranged and produce a pluggable electrical connection, the booth being detachably snap fastenable to the pluggable connection housing, characterised in that the boot is substantially tubular and has an undercut extending at least in certain places in the peripheral direction at one plug-in end, the undercut engages with at least one undercut element arranged in the plug-in aperture, when in the plugged-in position of the plug-in end.

2. The pluggable electrical connection housing with a cable boot according to claim 1, wherein two contact passageways are provided and extend parallel to one another, further characterised in that the undercut element is formed by two latching lugs that are arranged opposite one another, in at least one plug-in aperture of a contact passageway as.

3. The pluggable electrical connection housing with a cable boot according to claim 1, the booth having a slot for inserting a cable therein, further characterised in that the undercut of the boot is formed by a latching groove extending at a distance from an end faced of the plug-in end.

4. The pluggable electrical connection housing with a cable boot according to claim 3, further characterised in that compensating projections project radially outwardly from the boot between the end face and the latching groove.

5. The pluggable electrical connection housing with a cable boot according to claim 2, further characterised in that each of the latching lugs has a latching slope extending obliquely radially inwards with an adjoining offsets extending radially outwards on an inner wall of the contact passageway.

6. The pluggable electrical connection housing with a cable boot according to claim 5, further characterised in that the offset is formed by a housing aperture extending radially outwards.

7. The pluggable electrical connection housing with a cable boot according to claim 2, further characterised in that the latching lugs are identical.

8. The pluggable electrical connection housing with a cable boot according to claim 1, further characterised in that the contact passageways protrude upward from the pluggable connection housing with an end portion comprising the plug-in aperture.

9. The pluggable electrical connection housing with a cable boot according to claim 8, further characterised in that the end portion has at least one latching depression serving as the undercut element on its insides.

10. The pluggable electrical connection housing with a cable boot according to claim 1, further characterised in that the plug-in aperture is surrounded by a rim protruding radially outwardly beyond the end portion.

11. The pluggable electrical connection housing with a cable boot according to claim 10, further characterised in that struts extending from the rim downwards in the direction of the pluggable connection housing are arranged along an external faced of the end portion.

12. The pluggable electrical connection housing with a cable boot according to claim 1, further characterised in that the plug-in aperture is formed by a plug-in ring held at a distance from the rest of the pluggable connection housing.

13. The pluggable electrical connection housing with a cable boot according to claim 12, further characterised in that the plug-in ring is held at a distance from the upper end of the pluggable connection housing by at least two webs.

14. The pluggable electrical connection housing with a cable boot according to claim 13, further characterised in that the webs extend in a curved manner radially outwards.

15. The pluggable electrical connection housing with a cable boot according to claim 13, further characterised in that an underside of the plug-in ring forms the undercut elements.

16. The pluggable electrical connection housing with a cable boot according to claim 1, further characterised in that a plug-in slot extending transversely to the passageway is formed adjacent to the plug-in apertures in the pluggable connection housing, in which a substantially U-shaped circlip is inserted.

17. The pluggable electrical connection housing with a cable boot according to claim 15, further characterised in that the circlip engages with at least one leg behind the undercut on the boot in its plug-in position.

18. The pluggable electrical connection housing with a cable boot according to claim 17, further characterised in that the plug-in slot is continued remote from its slot aperture by receiving apertures formed in a wall of the pluggable connection housing for plugging-in of free ends of the legs.

19. The pluggable electrical connection housing with a cable boot according to claim 16, further characterised in that the circlip has two external and one central leg, a plug-in end of a boot being arranged and detachably held between the central and one external leg respectively in the plug-in position thereof.

20. The pluggable electrical connection housing with a cable boot according to claim 19, further characterised in that the central leg is formed as an undercut element in the direction of the respective contact passageway on both sides.

21. The pluggable electrical connection housing with a cable boot according to claim 16, further characterised in that the circlip can be inserted into the plug-in slot so as to be flush and can be locked in its end position.

22. The pluggable electrical connection housing with a cable boot according to claim 16, further characterised in that the circlip has on its upper side a latching element which can be locked in the end position of the circlip with a substantially complementary counter-latching element between the plug-in apertures in the pluggable connection housing.

23. The pluggable electrical connection housing with a cable boot according to claim 22, further characterised in that the counter-latching element is designed substantially as a circular hole.

24. The pluggable electrical connection housing with a cable boot according to claim 16, further characterised in that a rail-shaped guide with which a guide groove can be associated on an underside of the circlip for guidance along the guide rail, extends between the contact passageways.

25. The pluggable electrical connection housing with a cable boot according to claim 16, further characterised in that the plug-in slot is surrounded by a locating edge inclined obliquely inwards in the plug-in direction of the circlip.

26. The pluggable electrical connection housing with a cable boot according to claim 16, further characterised in that two said plug-in slots are arranged on opposing sides of the pluggable connection housing.

* * * * *